(12) United States Patent
Kang et al.

(10) Patent No.: US 9,363,774 B2
(45) Date of Patent: Jun. 7, 2016

(54) METHOD FOR TRANSMITTING SOUNDING SIGNAL IN WIRELESS COMMUNICATION SYSTEM

(75) Inventors: Byeong Woo Kang, Anyang-si (KR); Dae Won Lee, Anyang-si (KR); Yu Jin Noh, Anyang-si (KR); Bong Hoe Kim, Anyang-si (KR); Yong Ho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 13/580,097

(22) PCT Filed: Nov. 29, 2010

(86) PCT No.: PCT/KR2010/008492
§ 371 (c)(1),
(2), (4) Date: Aug. 20, 2012

(87) PCT Pub. No.: WO2011/105680
PCT Pub. Date: Sep. 1, 2011

(65) Prior Publication Data
US 2012/0327914 A1    Dec. 27, 2012

Related U.S. Application Data

(60) Provisional application No. 61/307,442, filed on Feb. 23, 2010.

(30) Foreign Application Priority Data

May 18, 2010    (KR) .......................... 10-2010-0046214

(51) Int. Cl.
*H04J 3/00*    (2006.01)
*H04W 56/00*    (2009.01)
(Continued)

(52) U.S. Cl.
CPC ............. *H04W 56/00* (2013.01); *H04L 5/0023* (2013.01); *H04L 5/0053* (2013.01); *H04L 5/16* (2013.01); *H04W 8/005* (2013.01); *H04W 8/186* (2013.01); *H04W 48/16* (2013.01); *H04W 84/12* (2013.01)

(58) Field of Classification Search
CPC ... H04L 5/0023; H04L 5/0064; H04L 5/0053; H04L 1/0625; H04L 2025/03802; H04L 25/0224
USPC .......................................................... 370/336
See application file for complete search history.

(56) References Cited

U.S. PATENT DOCUMENTS

2005/0276347 A1* 12/2005 Mujtaba et al. ............... 375/299
2007/0147284 A1*  6/2007 Sammour et al. ............. 370/328
(Continued)

FOREIGN PATENT DOCUMENTS

JP    2009-060596    3/2009
KR   10-2008-0028634   4/2008
(Continued)

*Primary Examiner* — Alpus H Hsu
*Assistant Examiner* — Elton Williams
(74) *Attorney, Agent, or Firm* — Lee Hong Degerman Kang & Waimey; Jonathan Kang; Jeffrey Lotspeich

(57) ABSTRACT

Disclosed is a method for allowing a station to transmit a sounding signal in a multiple-antenna wireless communication system, the method including receiving a group defining information about a group to which the station belongs from an access point (AP); determining a transmission time taken in transmitting a sounding signal by the respective stations, which belong to the group, on the basis of the group defining information; and transmitting a sounding signal to the AP in accordance with the transmission time and preset transmission order when receiving a sounding request signal from the AP.

4 Claims, 17 Drawing Sheets

(51) Int. Cl.
*H04L 5/00* (2006.01)
*H04L 5/16* (2006.01)
*H04W 8/18* (2009.01)
*H04W 48/16* (2009.01)
*H04W 84/12* (2009.01)
*H04W 8/00* (2009.01)

(56) References Cited

U.S. PATENT DOCUMENTS

| | | | |
|---|---|---|---|
| 2007/0189412 A1* | 8/2007 | Xia et al. | 375/292 |
| 2008/0247370 A1* | 10/2008 | Gu et al. | 370/338 |
| 2009/0042616 A1* | 2/2009 | Teo et al. | 455/562.1 |
| 2009/0252110 A1* | 10/2009 | Sridhara et al. | 370/330 |
| 2010/0111220 A1* | 5/2010 | Rouquette-Leveil et al. | 375/295 |
| 2010/0208781 A1* | 8/2010 | Wentink et al. | 375/219 |
| 2010/0260138 A1* | 10/2010 | Liu et al. | 370/330 |
| 2011/0002219 A1* | 1/2011 | Kim et al. | 370/203 |

FOREIGN PATENT DOCUMENTS

| | | |
|---|---|---|
| KR | 10-2008-0073191 | 8/2008 |
| KR | 10-2008-0093319 | 10/2008 |

\* cited by examiner

FIG. 12

| Group ID | AID1 (STA1) | AID2 (STA2) | AID3 (STA3) | AID4 (STA4) |

FIG. 13

| Group ID | AID1 (STA1) | Number of antennas for STA1 | AID2 (STA2) | Number of antennas for STA2 | AID3 (STA3) | Number of antennas for STA3 | AID4 (STA4) | Number of antennas for STA4 |
| --- | --- | --- | --- | --- | --- | --- | --- | --- |

METHOD FOR TRANSMITTING SOUNDING SIGNAL IN WIRELESS COMMUNICATION SYSTEM

CROSS-REFERENCE TO RELATED APPLICATIONS

This application is the National Stage filing under 35 U.S.C. 371 of International Application No. PCT/KR2010/008492, filed on Nov. 29, 2010, which claims the benefit of earlier filing date and right of priority to Korean Application No. 10-2010-0046214, filed on May 18, 2010, and also claims the benefit of U.S. Provisional Application Serial No. 61/307,442, filed on Feb. 23, 2010, the contents of which are all incorporated by reference herein in their entirety.

TECHNICAL FIELD

The present invention relates to wireless communications, and more particularly, to a method for transmitting a sounding signal in a wireless communication system.

BACKGROUND ART

Institute of electrical and electronics engineers (IEEE) 802.11 is one of widely spread standards related to a wireless local area network (WLAN), which is set by IEEE and broadly defines a physical (PHY) layer and a media access control (MAC) layer. IEEE 802.11 supports various frequency bands as well as a frequency band of 2.4 GHz. With regard to several standards of IEEE 802.11, set times, use frequency bands, frequency bandwidths, and transmission speeds thereof are as shown in the following table 1.

TABLE 1

| Standards | Set times | Use frequency bands | Frequency bandwidths | Transmission speeds |
|---|---|---|---|---|
| IEEE 802.11 | 1997 | 2 GHz | 20 MHz | 2 Mbps |
| IEEE 802.11b | October, 1997 | 2 GHz | 20 MHz | 11/22 Mbps |
| IEEE 802.11a | October, 1999 | 2 GHz | 20 MHz | 54 Mbps |
| IEEE 802.11g | June, 2000 | 2 GHz | 20 MHz | 54 Mbps |
| IEEE 802.11n | September, 2009 | 2/5 GHz | 20/40 MHz | 600 Mbps |

In Ethernet for wired communications, a transmitting terminal transmits a packet through a certain port and at the same time receives a packet through another port. If the transmitting terminal receives only its own packet, it is regarded that packet collision does not occur. If the transmitting terminal receives another packet besides its own packet, it is informed that the packet collision occurs. That is, in Ethernet, the transmitting terminal can sense the packet collision in a receiving terminal However, a wireless device of the IEEE 802.11 system operates in a half-duplex manner, so that a transmitting terminal cannot sense packet collision in a receiving terminal. Thus, the transmitting terminal of the IEEE 802.11 first ascertains whether a channel is idle, and then performs communication.

In IEEE 802.11, there are broadly two methods of ascertaining whether the transmitting terminal is transmitting a packet through a channel. A first method is to set up an inter frame space (IFS). A station senses that the channel is idle, and then performs transmission after the lapse of the IFS. This is because a remote station may start transmission at a point of time when sensing that the channel has already been idle.

A second method for ascertaining whether the channel is idle is to set up a contention window. The contention window is configured as a unit of slot on a time base, and a station ready for transmitting a packet is on standby during the contention window, in other words, an arbitrary time (backoff interval). After the lapse of this arbitrary time, the station senses the channel, i.e., ascertains whether the channel is idle. At this time, the packet is transmitted if the channel is idle, but the contention window is set up again if the channel is being used by another wireless device.

FIG. 1 is a view for explaining a method of ascertaining whether a channel is idle in the IEEE 802.11 system.

Referring to FIG. 1, it is shown that an MAC station of a station 3 (STA3) is the first to receive a packet. However, the station 3 transmits the packet after waiting a data inter frame space (DIFS). A station 1 (STA1) reserves the transmission of the packet since it senses that the channel is being occupied by the station 3 at a point of time when waiting a DIFS after the packet arrives at its own MAC station.

After the station 3 completes the transmission of the packet, each of the stations (STA1, STA2 and STA5) waits the DIFS, and is then on standby during the backoff interval arbitrarily selected by each station. If the station 2 (STA2) is the first station of which the backoff interval is elapsed, the station 2 performs the transmission of the packet but other stations wait with their own stored backoff intervals until the station 2 completes the transmission of the packet.

After the lapse of the DIFS after the station 2 completes the transmission, other stations STA1, STA4 and STA 5 are on standby during the stored backoff intervals, respectively. If the backoff interval of the station 4 STA4 is equal to that of the station 5 STA5, the station 4 and the station 5 transmit packets at the same time and thus a packet collision happens. In this case, the station 1, the station 4 and the station 5 wait the DIFS again, and then the station 1 having the shortest backoff interval starts the transmission of the packet.

In the IEEE 802.11 system, two fundamental problems arise because of wireless environmental characteristics. A first problem is a hidden node. Referring to FIG. 2, if there are three stations, a station A transmits a packet to a station B, but a station C cannot receive the packet. The station C senses a channel in order to transmit a packet to the station B and transmits the packet to the station B as sensing that the channel is idle, but at this time a packet collision occurs in the station B. In this case, the station C regards the station A as the hidden node.

A second problem is an exposed node. Assume an environment where there are four stations as shown in FIG. 3. In such an environment, a station B tries to transmit a packet to a station A, and a station C tries to transmit a packet to a station D. When the station C senses a channel, it is determined that the channel has already been occupied. However, the station C does not have to wait until the channel becomes idle, since the station A is out of a transmission region of the station C. In this case, the station B regards the station C as the exposed node.

SUMMARY OF INVENTION

Technical Problem

The present invention provides a method for transmitting a sounding signal in a wireless communication system.

Solution to Problem

In an aspect, there is provided a method for allowing a station to transmit a sounding signal in a multiple-antenna wireless communication system, the method including receiving a group defining information about a group to which the station belongs from an access point (AP); determining a transmission time taken in transmitting a sounding signal by the respective stations, which belong to the group, on the basis of the group defining information; and transmitting a sounding signal to the AP in accordance with the transmission time and preset transmission order when receiving a sounding request signal from the AP.

The group defining information may include at least one of information about the number of antennas of the respective stations, and information about the number of transmission layers of the respective stations.

The group defining information may include information about order of transmitting a sounding reference signal by the stations which belong to the group.

The transmission time may be proportional to the number of antennas of the stations which belongs to the group, or the number of transmission layers of the stations which belong to the group.

In another aspect, there is provided a method for allowing a station to transmit a sounding signal in a multiple-antenna wireless communication system, the method including receiving a group defining information about a group to which the station belongs from an access point (AP); receiving a sounding request signal from the AP; determining a transmission time taken in transmitting a sounding signal by the respective stations, which belong to the group, on the basis of the group defining information and the sounding request signal; and transmitting a sounding signal to the AP in accordance with the transmission time and preset transmission order.

The sounding request signal may include at least one of information about the number of antennas of the respective stations, information about the number of transmission layers of the respective stations, and information about the number of long training fields (LTF) of the respective stations. The group defining information may include identifiers (ID) of the stations which belong to the group and information about order of transmitting a sounding reference signal by the stations which belong to the group.

The transmission time may be proportional to the number of antennas of the stations which belongs to the group. Also, the transmission time may be proportional to the number of long training fields (LTF) or the number of transmission layers of the stations which belong to the group.

In still another aspect, there is provided a method for allowing a station to transmit a sounding signal in a multiple-antenna wireless communication system, the method including receiving a group defining information about a group to which the station belongs from an access point (AP); determining order of transmitting a sounding signal by the stations within the group to which the stations belong, on the basis of the group defining information; and transmitting a sounding signal to the AP during a preset maximum standby time in order of transmitting a sounding signal by the station when receiving a sounding request signal from the AP.

Advantageous Effects of Invention

According to an exemplary embodiment, a sounding signal can be effectively transmitted in a wireless communication system.

The effect obtained in this exemplary embodiment is not limited to the foregoing effects, and other unmentioned effects may be clearly understood by a person having an ordinary skill in the art, to which the present invention pertains, from the following descriptions.

BRIEF DESCRIPTION OF DRAWINGS

FIG. 12 is a view showing a group defining field for supporting the MU-MIMO.

FIG. 13 is a view showing a group defining field including information about the number of antennas of respective stations according to an exemplary embodiment of the present invention.

MODE FOR THE INVENTION

Configurations, operations and other features of the present invention can be easily appreciated by exemplary embodiments described below with reference to accompanying drawings. The following exemplary embodiments are examples where the technical features of the present invention are applied to an IEEE 802.11 system.

IEEE 802.11n is a standard supporting the maximum transmission speed of 600 Mbps (40 MHz, 4-layer transmission) using a band of 2.4 GHz/5 GHz, which uses a wider bandwidth than 802.11a/b/g and supports multiple input multiple out (MIMO) transmission.

Figure 4:
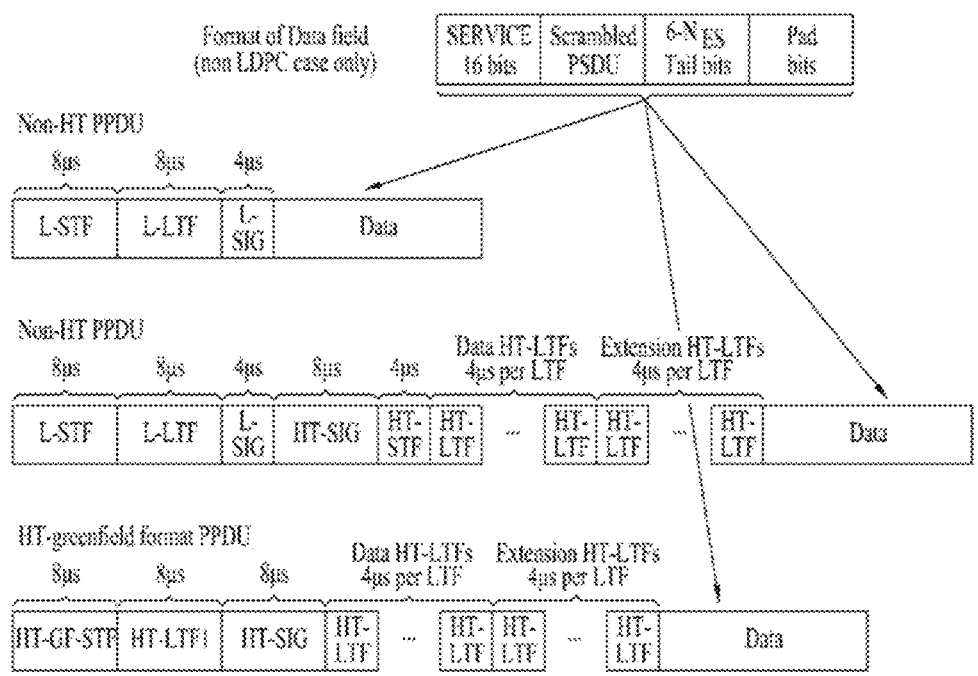
FIG. 4 is a view showing a physical layer convergence procedure protocol data unit (PPDU) format supported in the IEEE 802.11n system.

FIG. 4 is a view showing a physical layer convergence procedure protocol data unit (PPDU) format supported in the IEEE 802.11n system. Non-high throughput (HT) PPDU is a PPDU supported by the existing 802.11a/b/g. Legacy short training field (L-STF) is used for initial time estimation, automatic gain control convergence, and initial frequency offset estimation. Legacy long training field (L-LTF) is used for frequency offset and channel estimation. Legacy signal (L-SIG) contains packet information that a receiver has to be informed of in order to decode data following the L-SIG.

An HT-mixed format is a PPDU designed to make an HT STA of the IEEE 802.11n system and an STA of the legacy system coexist with each other. In this PPDU, a non-HT STF (L-STF), a non-HT LTF (L-LTF) and a non-HT SIG (L-SIG) are defined. The STA of the legacy system reads the L-SIG and then interprets the present PPDU with the following data, while the HT STA of the IEEE 802.11n system reads the HT-SIG following the L-SIG and is thus informed that the corresponding format is for the HT STA. In the HT system, single user (SU)-MIMO transmission is possible. Thus, a non-MIMO transmission method is used for transmitting the L-STA, the L-LTF, the L-SIG and the HT-SIG, while the SU-MIMO transmission method is applied from the HT-STF to Data.

Third, there is a HT-green field (GF) format. This PPDU is designed to support only the HT STA of the IEEE 802.11n instead of the coexistence with the STA of the legacy system.

Figure 1:
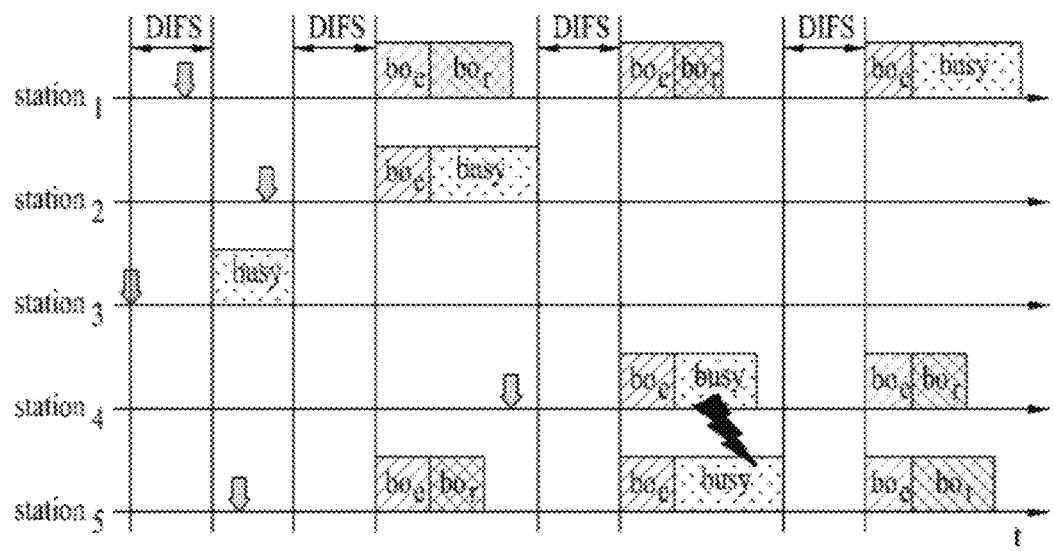
FIG. 1 is a view for explaining a method of ascertaining whether a channel is idle in the IEEE 802.11 system.
Figure 2:
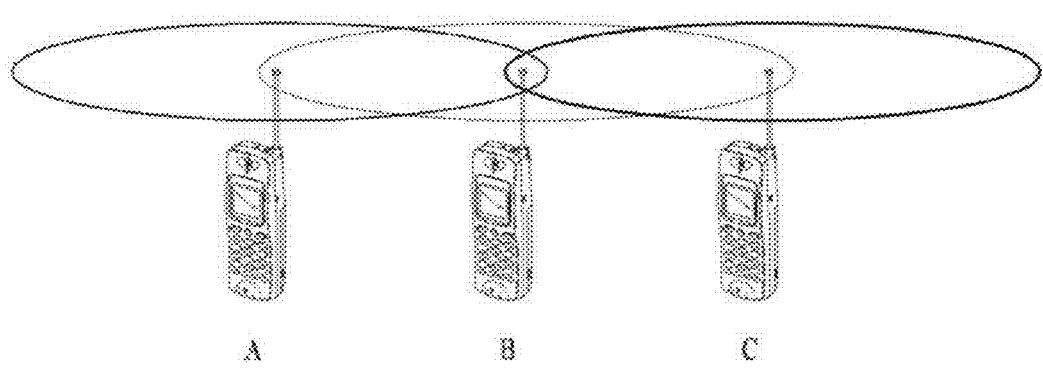
FIG. 2 is a view for explaining a problem of a hidden node in the IEEE 802.11 system.
Figure 3:
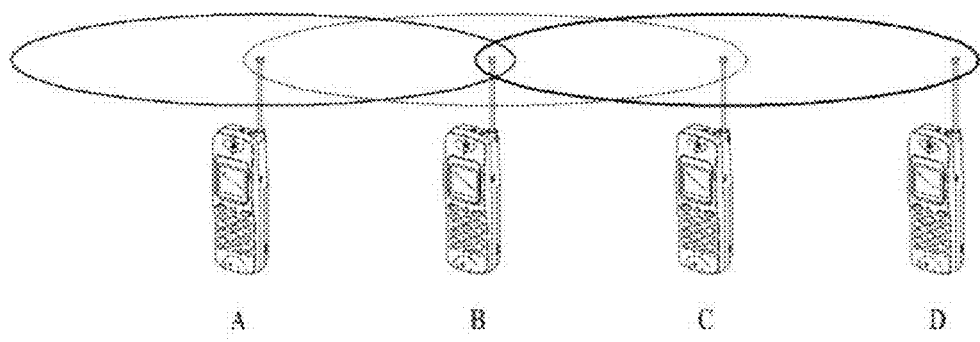
FIG. 3 is a view for explaining a problem of an exposed node in the IEEE 802.11 system.

As described above, the IEEE 802.11n defines the HT-LTF in the PPDU of the HT-mixed/HT-GF formats in order to estimate the MIMO channels. To estimate the MIMO channel through the HT-LTF, the HT-LTF is multiplied by an orthogonal mapping matrix $P_{HTLTF}$. 1 and −1 constitute the orthogonal mapping matrix $P_{HTLTF}$, which is shown in the following math FIG. 1.

$$P_{HTLTF} = \begin{bmatrix} 1 & -1 & 1 & 1 \\ 1 & 1 & -1 & 1 \\ 1 & 1 & 1 & -1 \\ -1 & 1 & 1 & 1 \end{bmatrix} \quad \text{[Math Figure 1]}$$

Figure 5:
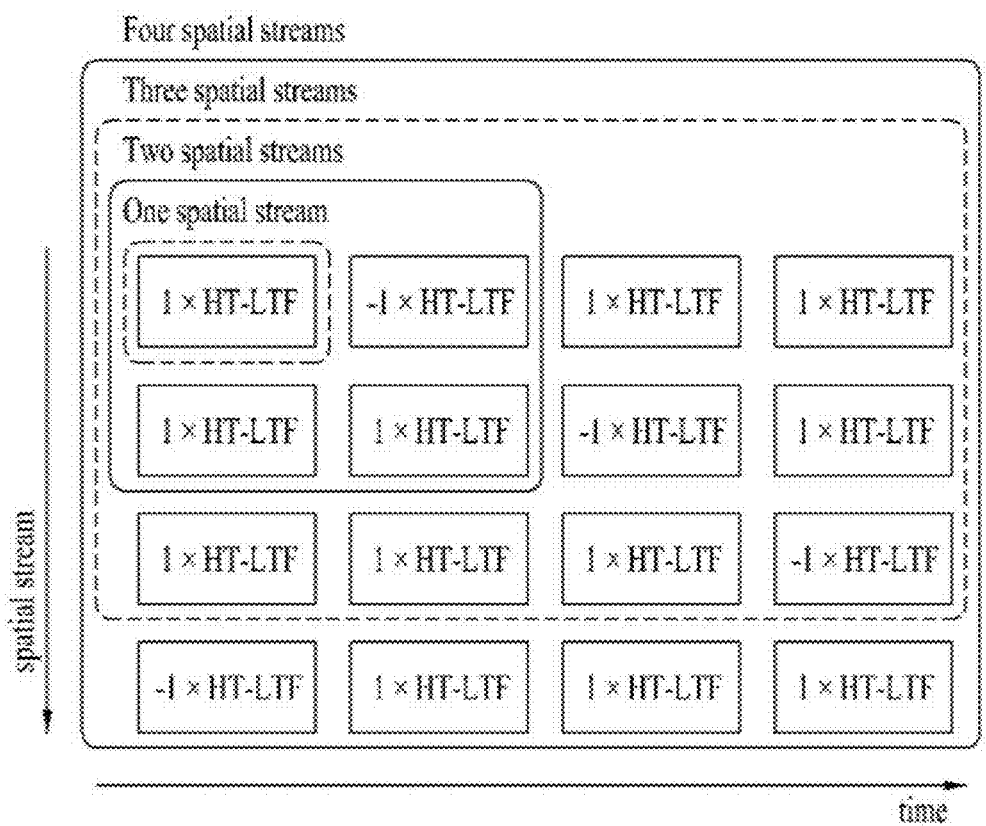
FIG. 5 is a view showing an orthogonal mapping matrix applied with different sizes in accordance with a layer or a rank of the channel.

As shown in FIG. 5, $P_{HTLTF}$ of the expression 1 is applied with different sizes in accordance with a layer or a rank of the channel.

Referring to FIG. 5, a training symbol is defined by a unit of spatial stream. If the number of spatial streams is 1, 2 and 4, one, two and four HT-LTFs are transmitted, respectively. However, if the number of spatial streams is 3, four HT-LTFs are used.

Figure 6:
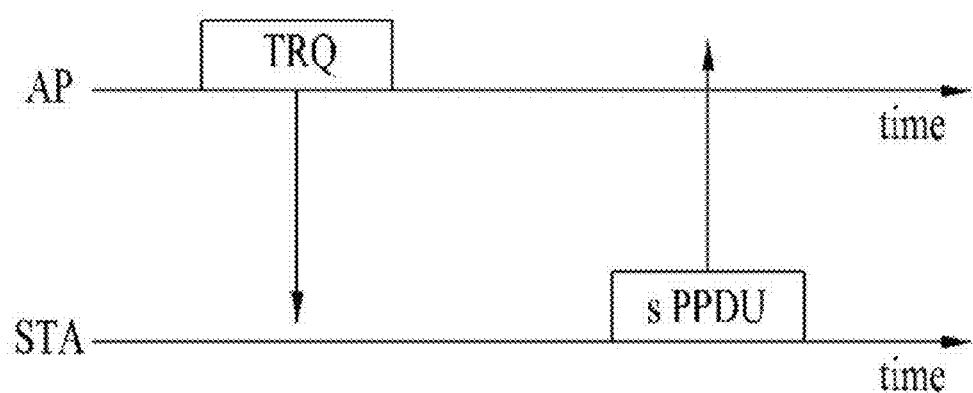
FIG. 6 is a view showing a sounding PPDU transmitting method defined in the IEEE 802.11n system.

In the IEEE 802.11n system defines a sounding PPDU for estimating a channel to support the MIMO transmission. Sounding is performed through the HT-LTF located in a physical layer convergence protocol (PLCP) preamble, and the total number of LTFs transmitted in a receiving terminal is determined by the total number of antennas of a receiver or the number of spatial streams. As shown in FIG. 6, if a transmitting terminal transmits a training request (TRQ), a receiver that receives the TRQ transmits a sounding PPDU.

The IEEE 802.11ac system requires higher throughput than the IEEE 802.11n system. To this end, the IEEE 802.11ac system uses a wider bandwidth than the IEEE 802.11n system and supports multi user (MU)-MIMO.

Figure 7:
FIG. 7 is a view showing a PPDU format supporting multi user (MU)-multiple input multiple out (MIMO) in the IEEE 802.11ac system.

FIG. 7 is a view showing a PPDU format for supporting MU-MIMO in the IEEE 802.11ac system.

Referring to FIG. 7, the PPDU for supporting the MU-MIMO has a PLCP preamble (L-STF, L-LTF, L-SIG) being at a head. Following the PLCP preamble, there is a very high throughput (VHT)-SIG A contained in information to be transmitted in common to stations (VHT STA) that receives data in a MU-MIMO method. After estimating the channel by the VHT-STF and the VHT-LTF, a VHT-SIG B is received. The VHT-SIG B contains specific information about the station. On the basis of this information, the VHT STA decodes VHT data. Information to be contained in the VHT-SIG A includes a group identifier (ID) for the MU-MIMO in addition to information about the spatial stream of each station. The VHT-SIG B contains coding types of the respective STAs and information about modulation and coding schemes (MCS).

To support the MU-MIMO, receiving terminals, i.e., stations have to perform sounding for informing a transmitting terminal, i.e., an access point (AP) of channel information. However, there is a problem that the length of sounding PPDU is variable depending on the number of antennas of the stations, i.e., the number of layers when the sounding is implemented. This will be described in more detail with the reference accompanying drawing.

Figure 8:
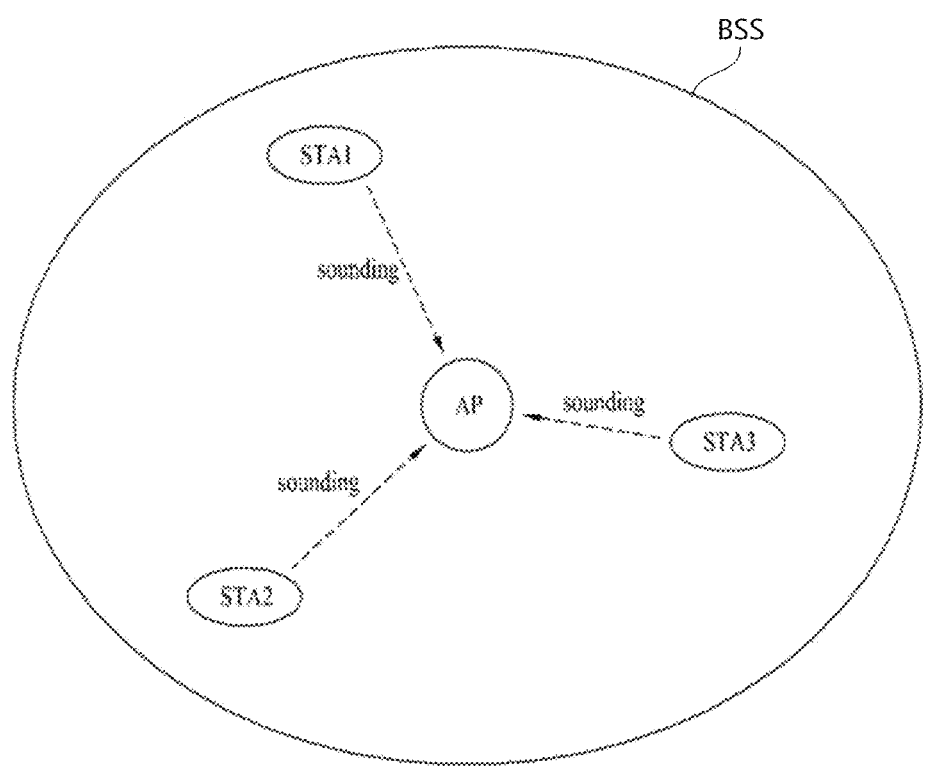
FIG. 8 is a view showing an environment where a sounding method is applied according to an exemplary embodiment of the present invention.

FIG. 8 is a view showing an environment where a sounding method is applied according to an exemplary embodiment of the present invention.

Referring to FIG. 8, suppose that three stations perform the sounding to the AP. Here, a time taken in the sounding of each station may be a problem. For example, if all stations perform the sounding at the same time, collision of the sounding PPDU occurs in the AP. In result, the AP fails in channel sounding.

This is because the stations cannot predict how much time will be taken in the sounding of other stations the respective stations cannot determine when they perform the sounding to the AP.

Figure 9:
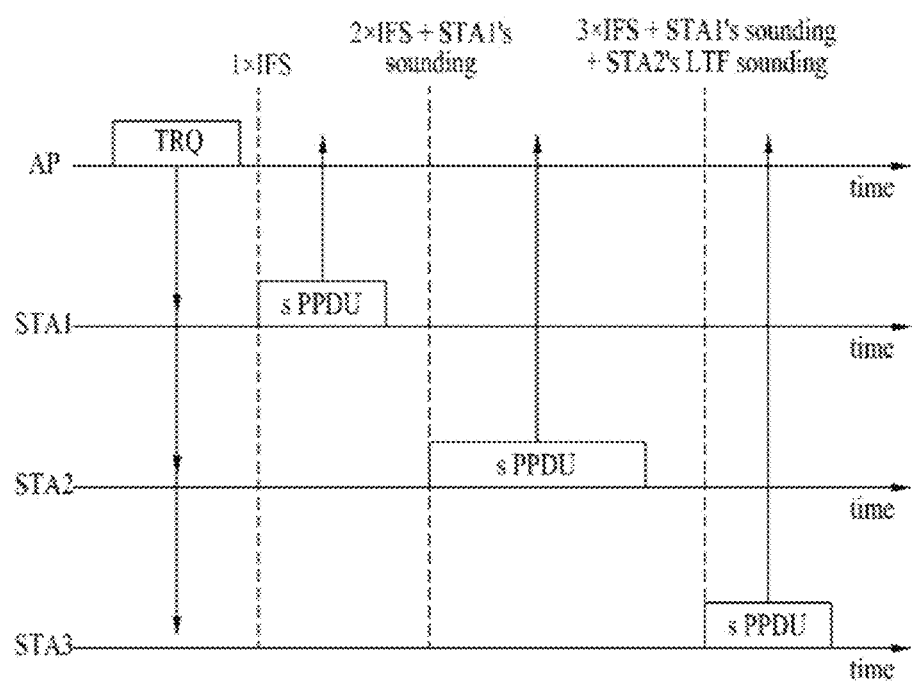
FIG. 9 is a concept view of a sounding method according to an exemplary embodiment of the present invention.

FIG. 9 is a concept view of a sounding method according to an exemplary embodiment of the present invention.

Referring to FIG. 9, each station receives the TRQ from the AP and waits a time in proportion to the number of antennas that other stations have, thereby performing the sounding. Here, a wait of a time proportional to the number of LTFs that each station transmits or the number of transmission layers may be considered besides the wait of a time proportional to the number of antennas of each station. This is because the number of antennas of each station is not always equal to the number of transmission layers in an AP position due to relationship between the antennas or pre-coding for spatial multiplexing. Below, the present invention will be described in more detail.

<First Exemplary Embodiment>

A first method among the sounding methods for supporting the MU-MIMO according to the present invention is that all the stations transmit a sounding PPDU after a preset maximum standby time is elapsed. With this method, separate signaling of the AP is unnecessary, and each station transmits a sounding PPDU in its turn after the maximum standby time is elapsed, regardless of the number of transmission layers. The maximum standby time may be set up on the basis of the maximum number of layers supported by the AP.

Figure 10:
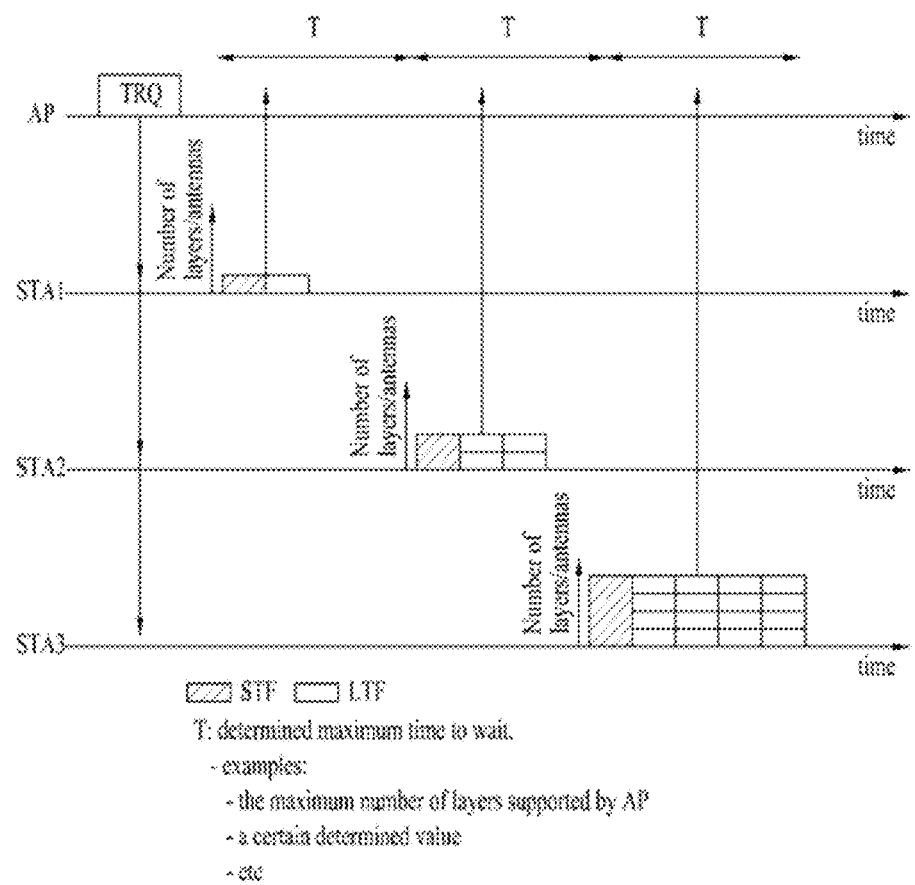
FIG. 10 is a view showing a sounding method for supporting the MU-MIMO according to a first exemplary embodiment of the present invention.

FIG. 10 is a view showing a sounding method for supporting the MU-MIMO according to a first exemplary embodiment of the present invention. Particularly, in FIG. 10, assume that the stations 1 to 3 respectively perform first layer transmission, second layer transmission and third layer transmission, and previously know their turns for performing the sounding.

Referring to FIG. 10, the station 1 waits as much as an inter frame space (IFS) after receiving the TRQ from the AP, and then transmits a sounding PPDU. After the lapse of the maximum standby time T, the station 2 transmits a sounding PPDU. Thereafter, after the maximum standby time T is elapsed again, the station 3 transmits a sounding PPDU. That is, the stations transmit their own sounding PPDU to the AP in their turn for transmitting the PPDU during the maximum standby time.

<Second Exemplary Embodiment>

A second method among the sounding methods for supporting the MU-MIMO according to the present invention is that the respective stations perform the sounding at a proper point of time by waiting only the minimum time. The respective stations have to send the sounding PPDU as many as the number of their own antennas. As described above, the number of necessary LTFs is defined in accordance with the number of antennas. Thus, if the sounding PPDU is transmitted after waiting only a time proportional to the number of LTFs that other stations have, it is advantageous to not only avoid the collision of the sounding PPDU but also make the sounding possible for the minimum necessary time.

Figure 11:
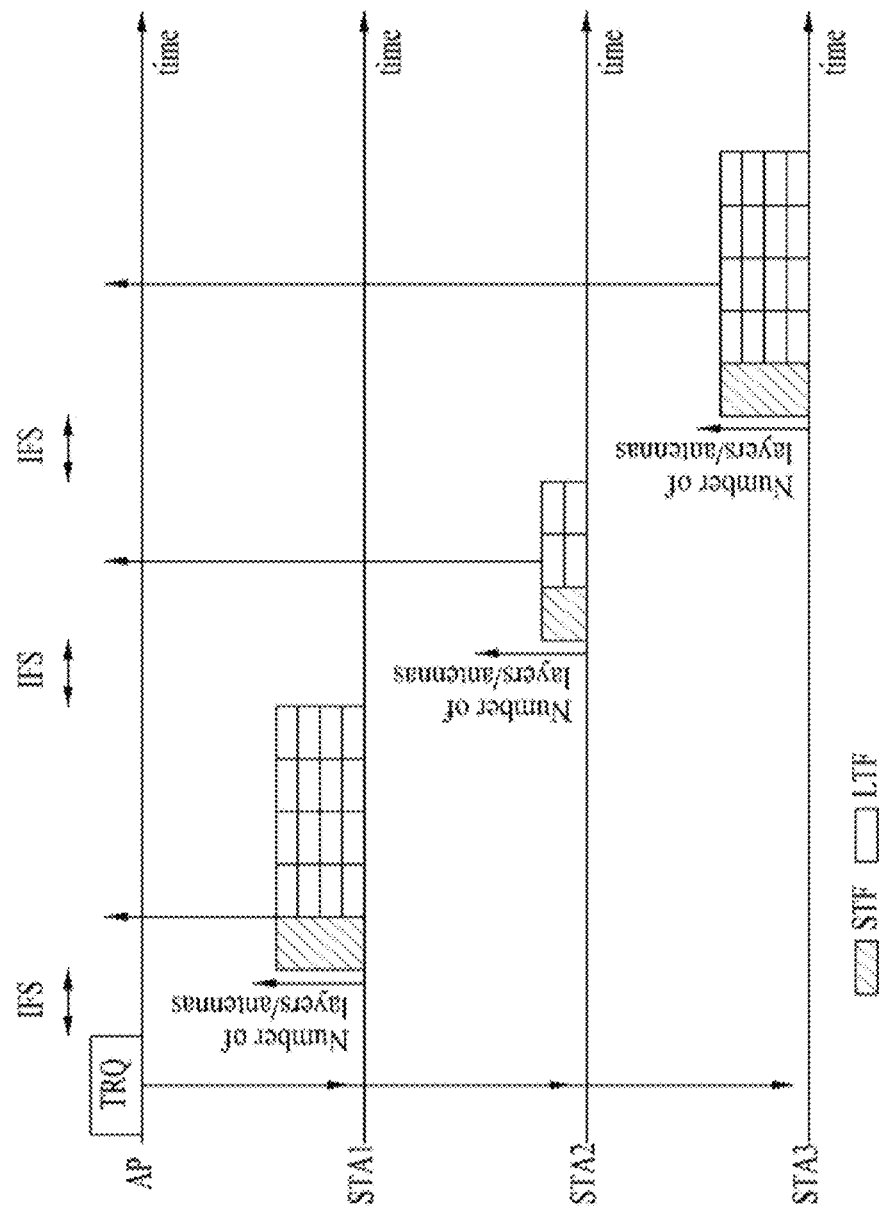
FIG. 11 is a view showing a sounding method for supporting the MU-MIMO according to a second exemplary embodiment of the present invention.

FIG. 11 is a view showing a sounding method for supporting the MU-MIMO according to a second exemplary embodiment of the present invention. Particularly, in FIG. 11, assume that each station previously knows its turn for transmitting the sounding PPDU, a station 1 has three antennas, a station 2 has two antennas, and a station 3 has four antennas.

Referring to FIG. 11, the numbers of LTFs that the stations 1, 2 and 3 have to transmit under the present IEEE 802.11n are 4, 2 and 4, respectively. When the AP transmits the TRQ for requesting the sounding PPDU, each station prepares for transmitting the sounding PPDU.

First, the station 1 waits the IFS after receiving the TRQ and then transmits the sounding PPDU. The station 1 transmits the sounding PPDU containing total four LTFs. The stations 2 and 3 are previously informed that the station 1 transmits the sounding PPDU configured with four LTFs, and waits for transmitting the sounding PPDU. After the station 1 completes the transmission of the sounding PPDU, the station 2 transmits the sounding PPDU. At this time, the station 2 transmits the sounding PPDU configured with two LTFs, and the station 3 is informed of it and waits for transmitting the sounding PPDU. When the station 2 completes the transmission of the sounding PPDU, the station 3 transmits the sounding PPDU.

According to the second exemplary embodiment of the present invention, it is assumed that each station is informed of the number of antennas that other stations have. Below, a signaling method for the second exemplary embodiment of the present invention will be described.

In light of supporting the MU-MIMO transmission, the AP previously groups the stations by a group ID and transmits a signal containing a group defining field as shown in FIG. 12. The signal shown in FIG. 12 contains the group ID and the IDs of the stations included in the group, so that the stations can be previously informed which stations belong to their own group and that the sounding PPDU has to be transmitted in which turn.

Thus, as a first signaling method for supporting the second exemplary embodiment, it is proposed that the group defining field contains information about the number of antennas each station has (see FIG. 13). Each station may be informed of the number of LTFs and the number of transmission layers instead of the number of antennas each station has.

Figure 14:
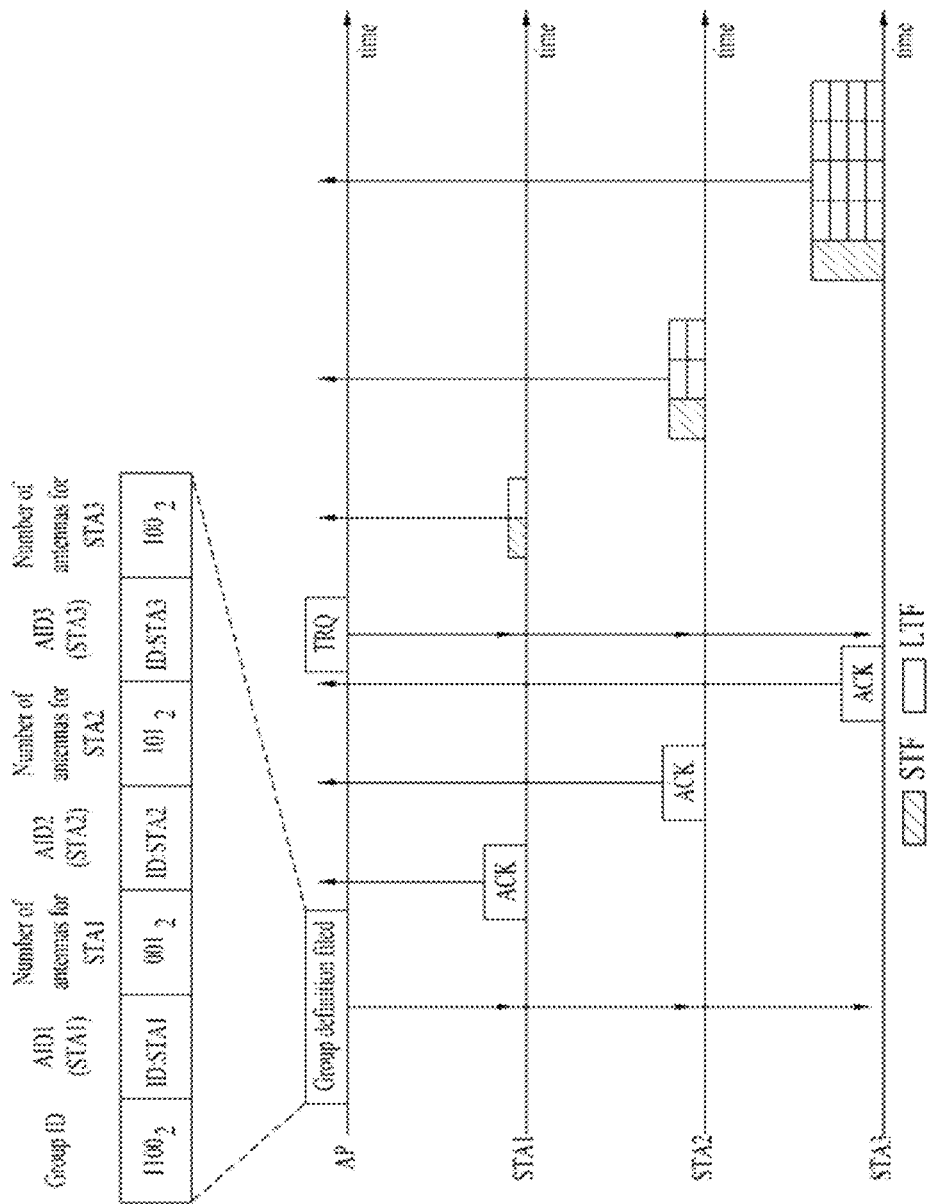
FIG. 14 is a view for explaining an example of transmitting a sounding PPDU by a first signaling method according to the second exemplary embodiment of the present invention.

FIG. 14 is a view for explaining an example of transmitting a sounding PPDU by the first signaling method according to the second exemplary embodiment of the present invention.

Referring to FIG. 14, assume that there are total six stations within coverage of the AP, and the MU-MIMO transmission is performed for the stations 1, 2 and 3 among them. Also, assume that the stations 1, 2 and 3 have one, two and four antennas, respectively.

The AP transmits a group defining field to the stations set up as a MU-MIMO group. The group defining field contains the group ID, the ID of each station (MAC ID or ID substituted for the MAC ID), and information about the number of antennas each station has or the number of LTFs each station transmits. Thus, each station can be informed how many antennas are provided in other stations having the same group ID. The station 2 calculates a point of time to send its own sounding PPDU on the assumption that the station 1 sends one LTF, and the station 3 calculates a point of time to send its own sounding PPDU on the assumption that the station 1 sends one LTF and the station 2 sends two LTFs.

As a second signaling method for supporting the second exemplary embodiment, it is proposed that the number of antennas of each station or the number of LTFs is assigned for signaling when the AP transmits the TRQ.

Figure 15:
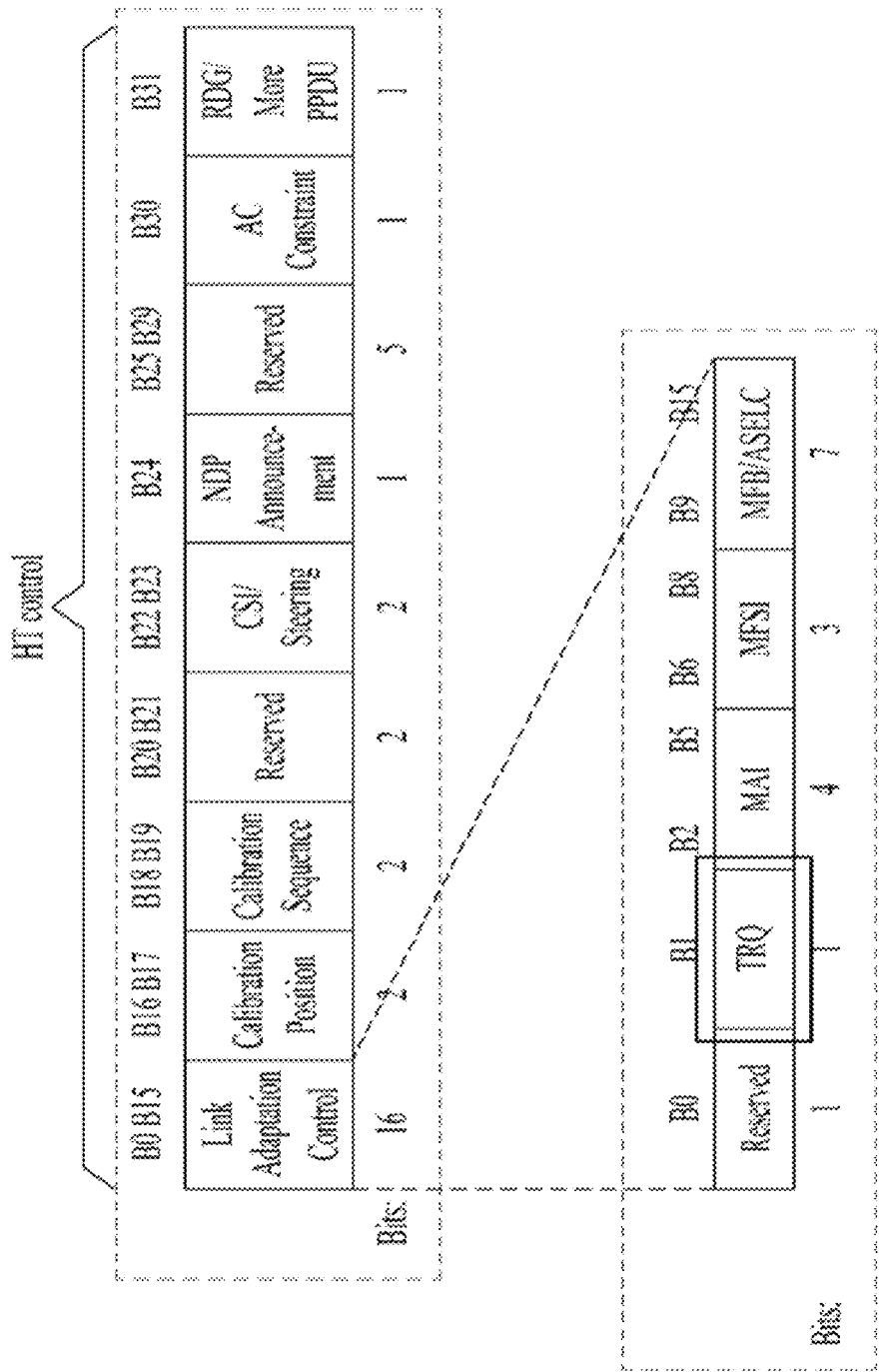
FIG. 15 is a view showing a high throughput (HT) control field frame defined in the IEEE 802.11n system.

FIG. 15 is a view showing a high throughput (HT) control field frame defined in the IEEE 802.11n system. As shown in FIG. 15, the TRQ is defined as 1-bit information in the HT control field frame, and transmitted to the stations. However, the IEEE 802.11n supports only the SU-MIMO, and therefore the HT control field frame has to be modified to support the MU-MIMO.

Figure 16:
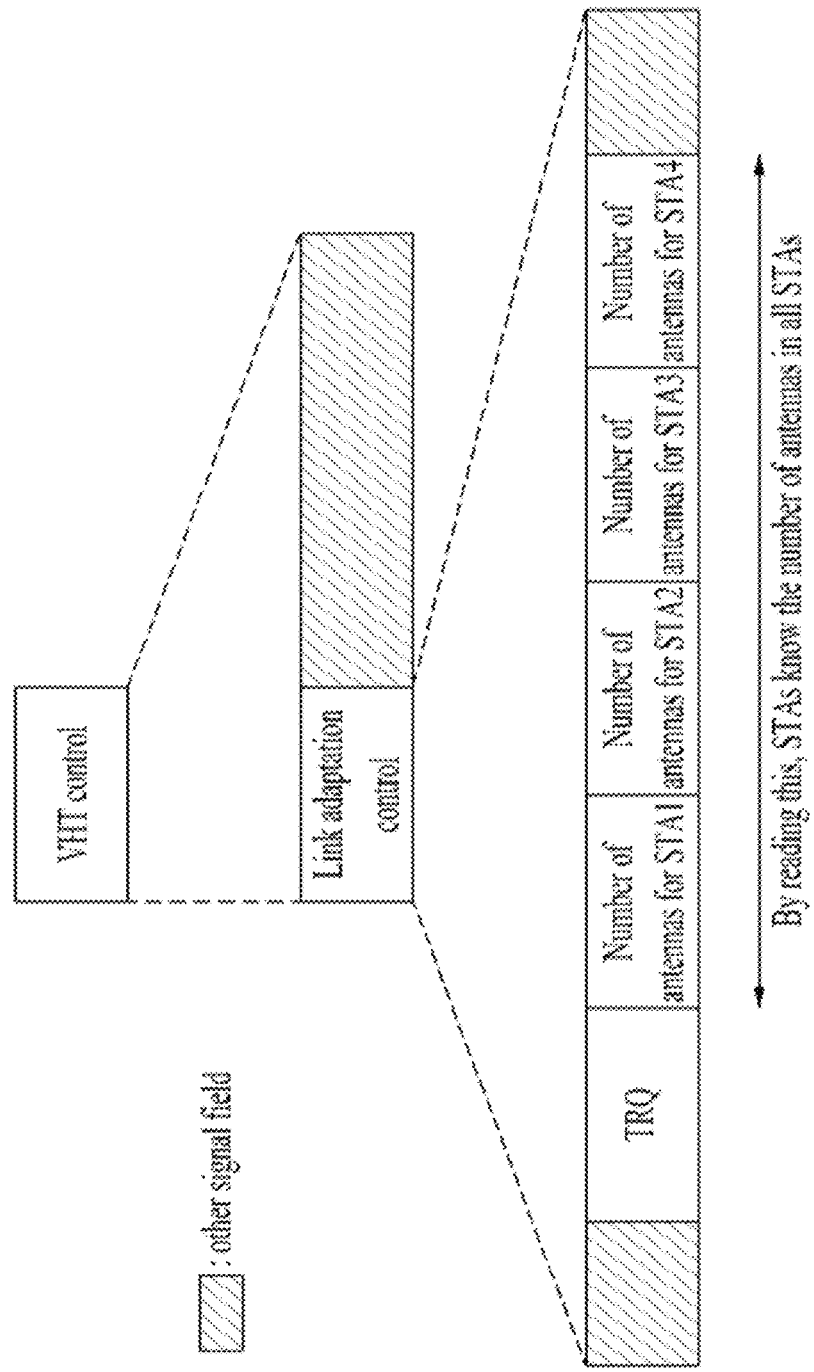
FIG. 16 is a view showing an example of a control field frame for transmitting a sounding PPDU by a second signaling method according to the second exemplary embodiment of the present invention.

FIG. 16 is a view showing an example of a control field frame for transmitting a sounding PPDU by the second signaling method according to the second exemplary embodiment of the present invention.

Referring to FIG. 16, a field about the number of antennas is defined in addition to a TRQ field within the control field frame supporting a very high throughput (VHT). The AP can indicate the number of antennas each station has, at the same time when transmitting the TRQ to each station. On the basis of such information, each station can calculate a time to be taken for the sounding PPDU by other stations, and determine a point of time to transmit its sounding PPDU. Here, each station may be informed of the number of LTFs and the number of transmission layers besides the number of antennas each station has.

Figure 17:
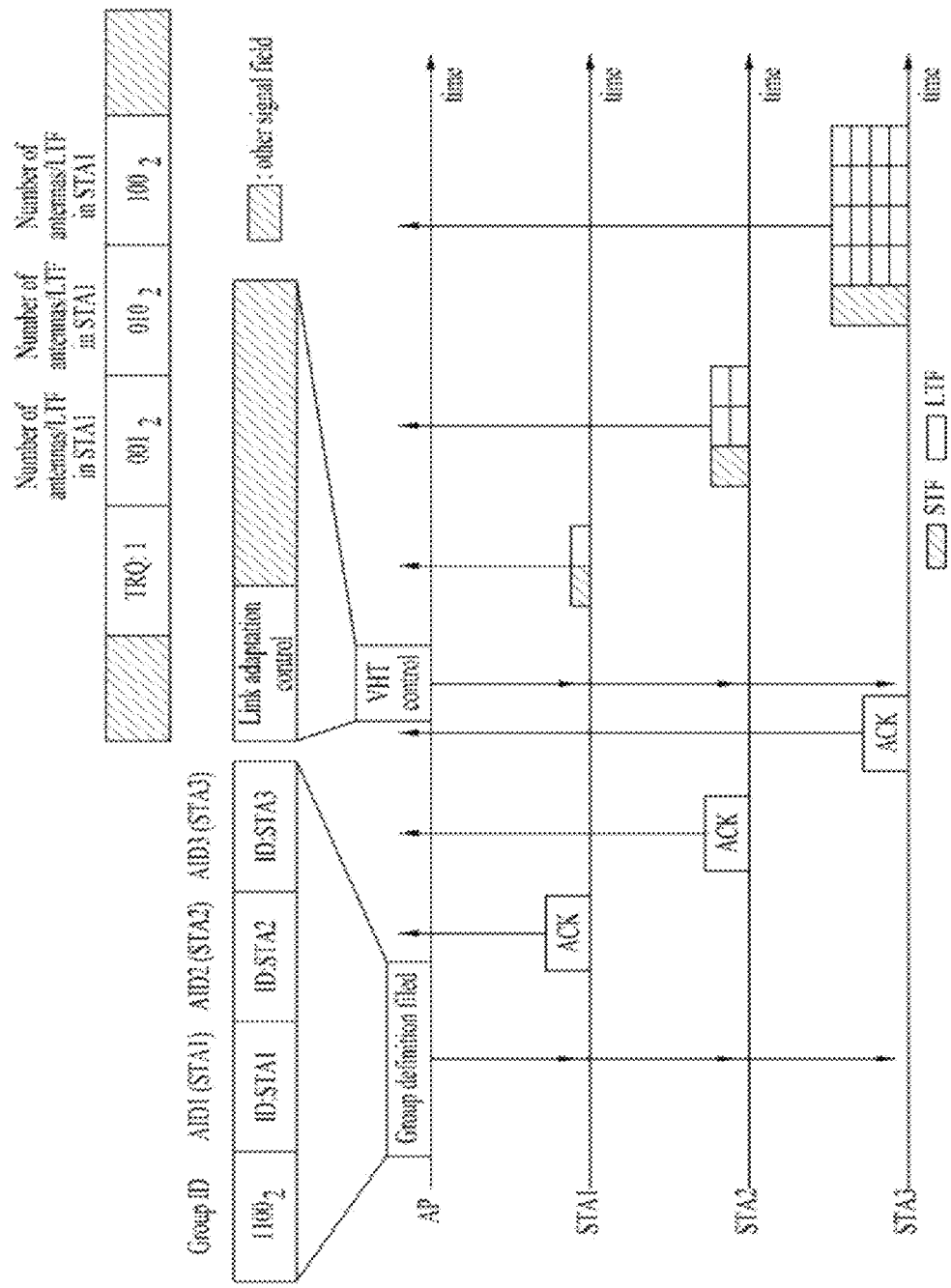
FIG. 17 is a view showing a method for transmitting a sounding PPDU by the second signaling method according to the second exemplary embodiment of the present invention.

FIG. 17 is a view showing a method for transmitting a sounding PPDU by the second signaling method according to the second exemplary embodiment of the present invention.

Referring to FIG. 17, the AP transmits the group defining field to the stations and informs the stations of the group ID for the MU-MIMO transmission. After ascertaining that the stations are grouped into an MU-MIMO group, the AP transmits the TRQ to each station so that the station transmits the sounding PPDU. At this time, the number of antennas each station has is assigned while transmitting the TRQ. Each station reads a VHT control field frame, and is thus informed of how many antennas are provided in other stations having the same group ID for the MU-MIMO.

The exemplary embodiments described above are achieved by combining elements and features of the present invention in a predetermined form. The elements or features have to be considered as they are optional as long as there is no separate explicit mention. The elements or features may be implemented in the form of being not combined with other elements or features. Also, some elements and/or features are combined to achieve the exemplary embodiment of the present invention. Operations described in the exemplary embodiments of the present invention may be varied in order. Partial configuration or features of one exemplary embodiment may be involved in another exemplary embodiment, or replaced with corresponding configuration or features of another exemplary embodiment. It is obvious that claims not clearly cited by each other are combined to form an exemplary embodiment or to be included as a new claim by amendment after application.

In this specification, the exemplary embodiments of the present invention were described centering on a data transmitting/receiving relationship between a station and a base station. Here, a specific operation performed in the base station may be performed by an upper node as necessary. That is, it will be appreciated that various operations performed for communication with the station in a network having a plurality of network nodes including the base station may be performed by the base station or network nodes other than the base station. The term base station may be replaced by a fixed station, a Node B, an eNode B (eNB), an access point, etc. Also, the term station may be substituted by user equipment (UE), a mobile station (MS), a mobile subscriber station (MSS), etc.

The exemplary embodiments of the present invention may be achieved by various means, e.g., hardware, firmware, software, combination thereof, or the like. In the case of hardware, an exemplary embodiment of the present invention may be achieved by one or more of application specific integrated circuits (ASICs), digital signal processors (DSPs), digital signal processing devices (DSPDs), programmable logic devices (PLDs), field programmable gate arrays (FPGAs), a processor, a controller, a microcontroller, a microprocessor, etc.

In the case of firmware or software, an exemplary embodiment of the present invention may be achieved in the form of a module, a procedure, a function, etc. for implementing the functions or operations described above. A software code may be stored in a memory unit and driven by a processor. The memory unit may be placed inside or outside of the processor, and can transmit and receive data to and from the processor through already published various means.

It is obvious to those skilled in the art that the present invention can be embodied in other specific forms without departing from the scope of the present invention. Therefore, the foregoing detailed descriptions have to be not restrictively interpreted in all aspects but considered as an example. The scope of the present invention has to be determined by reasonable interpretation based on the appended claims, and all modifications within scope equivalent to the present invention are involved in the scope of the present invention.

INDUSTRIAL APPLICABILITY

The method for transmitting a sounding signal in the foregoing wireless communication system was described centering on an example of being applied to the IEEE 802.11 system, but might be applied to various multiple-antenna wireless communication systems besides the IEEE 802.11 system.

The invention claimed is:

1. A method for allowing a station to transmit a sounding signal in a multiple-antenna wireless communication system, the method comprising
receiving, by the station, a first frame including a group defining field from an access point (AP), the group defining field including information on a group identifier of a plurality of stations being receivers of a multi user (MU)-multiple input multiple output (MIMO) transmission of the AP, the plurality of the stations including the station;
receiving, by the station, a second frame including a training request (TRQ) field and an antenna field, the TRQ field including information on triggering each transmission of sounding physical layer protocol data units (PPDUs) of each of the plurality of the stations for a channel estimation between the AP and the each of the plurality of the stations and the antenna field including information on a number of antennas of the each of the plurality of the stations used to transmit each of the sounding PPDUs;
determining, by the station, a transmission time of a sounding PPDU based on the antenna field; and
transmitting, by the station, the sounding PPDU to the AP based on the transmission time,
wherein the group defining field further includes information on a transmission order of the sounding PPDU and each of at least one sounding PPDU transmitted by each of at least one remaining station without the station included in the plurality of the stations,
wherein the transmission time increases proportional to a sum of a number of antennas of at least one station among the at least one remaining station transmitting another sounding PPDU before the station transmits the sounding PPDU when the station is configured to wait a minimum time to transmit the sounding PPDU,
wherein the number of antennas of the at least one station is determined based on the information on the transmission order and the antenna field,
wherein the transmission time increases proportional to a maximum number of layers supported by the AP when the station is configured to wait a maximum time to transmit the sounding PPDU, and
wherein a number of long training fields (LTFs) in the sounding PPDU is determined based on information on the number of antennas of the station included in the antenna field.

2. A station (STA) to transmit a sounding signal in a multiple-antenna wireless communication system, the STA comprising:
a RF(radio frequency) unit configured to transmit or receive a radio signal; and
a processor operatively connected to the RF unit and configured to receive a first frame including a group defining field from an access point (AP), the group defining field including information on a group identifier of a plurality of stations being receivers of a multi use(MU)-multiple input multiple output (MIMO) transmission of the AP, the plurality of the stations including the station,
receive a second frame including a training request (TRQ) field and an antenna field, the TRQ field including information on triggering each transmission of sounding physical layer protocol data units (PPDUs) of each of the plurality of the stations for a channel estimation between the AP and the each of the plurality of the stations and the antenna field including information on a number of antennas of the each of the plurality of the stations used to transmit each of the sounding PPDUs,
determine a transmission time of a sounding PPDU based on the antenna field, and
transmit the sounding PPDU to the AP based on the transmission time,
wherein the group defining field further includes information on a transmission order of the sounding PPDU and each of at least one sounding PPDU transmitted by each of at least one remaining station without the station included in the plurality of the stations,
wherein the transmission time increases proportional to a sum of a number of antennas of at least one station among the at least one remaining station transmitting another sounding PPDU before the station transmits the sounding PPDU when the station is configured to wait a minimum time to transmit the sounding PPDU, wherein the number of antennas of the at least one station is determined based on the information on the transmission order and the antenna field, wherein the transmission time increases proportional to a maximum number of layers supported by the AP when the station is configured to wait a maximum time to transmit the sounding PPDU, and wherein a number of long training fields (LTFs) in the sounding PPDU is determined based on information on the number of antennas of the station included in the antenna field.

3. A method for a sounding procedure, the method comprising:

transmitting, by an access point (AP), a first frame including a group defining field to a plurality of stations, the group defining field including information on an group identifier of the plurality of stations being receivers of multi user (MU)-multiple input multiple output (MIMO) transmission of the AP;

transmitting, by the AP, a second frame including a training request (TRQ) field and an antenna field, the TRQ field including information on triggering each transmission of sounding physical layer protocol data units (PPDUs) of each of the plurality of the stations for a channel estimation between the AP and the each of the plurality of the stations and the antenna field including information on a number of antennas of the each of the plurality of the stations used to transmit each of the sounding PPDUs; and receiving, by the AP, each of the sounding PPDUs from the each of the plurality of stations sequentially as responses of the second frame, wherein the group defining field further includes information on a transmission order of the sounding PPDUs, wherein the each of the sounding PPDUs is received based on each of the transmission times of the each of the sounding PPDUs, wherein the transmission times of the each of the sounding PPDUs is determined based on the transmission order and the number of antennas of the each of the plurality of stations when the station is configured to wait a minimum time to transmit the sounding PPDU, wherein the transmission times of the each of sounding PPDU is determined based on a maximum number of layers supported by the AP when the station is configured to wait a maximum time to transmit the sounding PPDU, and wherein each of a number of long training fields (LTFs) in the each of the sounding PPDUs is determined based on information on the number of antennas of the each of the plurality of the stations used to transmit the each of the sounding PPDUs.

4. An access point (AP) for a sounding procedure, the AP comprising:

a RF(radio frequency) unit configured to transmit or receive a radio signal; and a processor operatively connected to the RF unit and configured to:

transmit a first frame including a group defining field to a plurality of stations, the group defining field including information on an group identifier of the plurality of stations being receivers of multi user (MU)-multiple input multiple output (MIMO) transmission of the AP, transmit a second frame including a training request (TRQ) field and an antenna field, the TRQ field including information on triggering each transmission of sounding physical layer protocol data units (PPDUs) of each of the plurality of the stations for a channel estimation between the AP and the each of the plurality of the stations and the antenna field including information on a number of antennas of the each of the plurality of the stations used to transmit each of the sounding PPDUs, and receive each of the sounding PPDUs from the each of the plurality of stations sequentially as responses of the second frame, wherein the group defining field further includes information on a transmission order of the sounding PPDUs, wherein the each of the sounding PPDUs is received based on each of the transmission times of the each of the sounding PPDUs, wherein the transmission times of the each of the sounding PPDUs is determined based on the transmission order and the number of antennas of the each of the plurality of stations when the station is configured to wait a minimum time to transmit the sounding PPDU, wherein the transmission times of the each of sounding PPDU is determined based on a maximum number of layers supported by the AP when the station is configured to wait a maximum time to transmit the sounding PPDU, and wherein each of a number of long training fields (LTFs) in the each of the sounding PPDUs is determined based on information on the number of antennas of the each of the plurality of the stations used to transmit the each of the sounding PPDUs.

* * * * *